(12) United States Patent  
Harbers

(10) Patent No.: US 9,328,880 B2
(45) Date of Patent: *May 3, 2016

(54) AUTOMATED COLOR TUNING OF AN LED BASED ILLUMINATION DEVICE

(71) Applicant: Xicato, Inc., San Jose, CA (US)

(72) Inventor: Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,661

(22) Filed: Sep. 29, 2014

(65) Prior Publication Data

US 2015/0118933 A1    Apr. 30, 2015

Related U.S. Application Data

(63) Continuation of application No. 14/106,097, filed on Dec. 13, 2013, now Pat. No. 8,845,380.

(60) Provisional application No. 61/738,314, filed on Dec. 17, 2012.

(51) Int. Cl.
    *H01S 4/00*     (2006.01)
    *H05B 33/10*    (2006.01)
    (Continued)

(52) U.S. Cl.
    CPC ... *F21K 9/90* (2013.01); *F21K 9/56* (2013.01); *F21V 9/16* (2013.01); *G01J 3/0251* (2013.01);
    (Continued)

(58) Field of Classification Search
    CPC ............ F21K 9/90; F21K 9/56; G01J 3/0251; G01J 3/505; F21V 9/16; H05B 33/10; H05B 33/02; H05B 33/00; H01J 17/49; F21Y 2101/02
    See application file for complete search history.

(56) References Cited

U.S. PATENT DOCUMENTS 5,959,316 A    9/1999 Lowery
6,351,069 B1   2/2002 Lowery et al.
               (Continued)

FOREIGN PATENT DOCUMENTS

EP    1 657 757 A2    5/2006
TW    201000600 A     1/2010
      (Continued)

OTHER PUBLICATIONS

International Search Report and Written Opinion mailed on Jun. 2, 2014 for International Application No. PCT/US2013/075436 filed on Dec. 16, 2013, 11 pages.

(Continued)

*Primary Examiner* — Donald Raleigh
(74) *Attorney, Agent, or Firm* — Silicon Valley Patent Group LLP

(57) ABSTRACT

The color of light emitted by an assembled light emitting diode (LED) based illumination device with at least two different wavelength converting materials is automatically tuned to within a predefined tolerance of a target color point by modifying portions of the wavelength converting materials. The color of light emitted from the assembled LED based illumination device is measured and a material modification plan is determined based at least in part on the measured color of light and a desired color of light to be emitted. The material modification plan may further include the location of the wavelength converting materials to be modified. The wavelength converting materials are selectively modified in accordance with the material modification plan so that the assembled LED based illumination device emits a second color of light that is within a predetermined tolerance of a target color point.

27 Claims, 14 Drawing Sheets

(51) Int. Cl.
  *F21K 99/00* (2016.01)
  *F21V 9/16* (2006.01)
  *G01J 3/02* (2006.01)
  *G01J 3/50* (2006.01)
  *F21Y 101/02* (2006.01)
  *H01J 17/49* (2012.01)
  *H05B 33/00* (2006.01)
  *H05B 33/02* (2006.01)

(52) U.S. Cl.
  CPC ............... *G01J 3/505* (2013.01); *H05B 33/10* (2013.01); *F21Y 2101/02* (2013.01); *H01J 17/49* (2013.01); *H05B 33/00* (2013.01); *H05B 33/02* (2013.01)

(56) References Cited

U.S. PATENT DOCUMENTS

| | | | |
|---|---|---|---|
| 6,504,301 | B1 | 1/2003 | Lowery |
| 6,586,882 | B1 | 7/2003 | Harbers |
| 6,600,175 | B1 | 7/2003 | Baretz et al. |
| 6,680,569 | B2 | 1/2004 | Mueller-Mach et al. |
| 6,812,500 | B2 | 11/2004 | Reeh et al. |
| 7,126,162 | B2 | 10/2006 | Reeh et al. |
| 7,250,715 | B2 | 7/2007 | Mueller et al. |
| 7,462,502 | B2 | 12/2008 | Paolini et al. |
| 7,479,662 | B2 | 1/2009 | Soules et al. |
| 7,564,180 | B2 | 7/2009 | Brandes |
| 7,614,759 | B2 | 11/2009 | Negley |
| 7,629,621 | B2 | 12/2009 | Reeh et al. |
| 8,104,908 | B2 | 1/2012 | Harbers et al. |
| 8,408,726 | B2 | 4/2013 | Harbers et al. |
| 8,835,963 | B2 | 9/2014 | Haase et al. |
| 8,845,380 | B2 * | 9/2014 | Harbers ..................... 445/24 |
| 8,870,617 | B2 * | 10/2014 | Harbers ..................... 445/24 |
| 8,899,767 | B2 | 12/2014 | Harbers et al. |
| 8,998,452 | B2 | 4/2015 | Parker et al. |
| 2007/0081336 | A1 | 4/2007 | Bierhuizen et al. |
| 2009/0101930 | A1 | 4/2009 | Li |
| 2009/0117672 | A1 | 5/2009 | Caruso et al. |
| 2009/0261358 | A1 | 10/2009 | Chitnis et al. |
| 2010/0127282 | A1 * | 5/2010 | Harbers ............... F21K 9/54 257/89 |
| 2010/0127289 | A1 * | 5/2010 | Helbing et al. ............ 257/98 |
| 2010/0207521 | A1 * | 8/2010 | Tamaki ............ H01L 33/504 313/506 |
| 2010/0327306 | A1 | 12/2010 | Van Der Burgt et al. |
| 2011/0070669 | A1 | 3/2011 | Hiller et al. |
| 2011/0216522 | A1 | 9/2011 | Harbers et al. |
| 2012/0099290 | A1 | 4/2012 | Harbers et al. |
| 2012/0280256 | A1 | 11/2012 | Negley |
| 2012/0300452 | A1 | 11/2012 | Harbers et al. |
| 2013/0215599 | A1 * | 8/2013 | Davis ................... F21V 7/0008 362/84 |
| 2013/0241393 | A1 * | 9/2013 | Hayashida ............. F21K 9/56 313/502 |
| 2013/0323862 | A1 | 12/2013 | Nonomura |
| 2013/0343034 | A1 | 12/2013 | Harbers et al. |
| 2014/0111985 | A1 | 4/2014 | Harbers et al. |
| 2014/0159093 | A1 | 6/2014 | Kraeuter |
| 2015/0099415 | A1 | 4/2015 | Harbers |

FOREIGN PATENT DOCUMENTS

| | | | |
|---|---|---|---|
| TW | 201208110 A | 2/2012 | |
| TW | 201243239 A | 11/2012 | |
| TW | 201248936 A | 12/2012 | |
| TW | 201251130 A | 12/2012 | |
| WO | WO 2012/024598 A2 | 2/2012 | |
| WO | WO 2012024598 A2 * | 2/2012 | ............ F21V 7/0008 |
| WO | WO 2012/164930 A1 | 12/2012 | |
| WO | WO 2013/032692 A1 | 3/2013 | |

OTHER PUBLICATIONS

Notice of Allowance mailed on Apr. 28, 2014 for U.S. Appl. No. 14/106,097, filed Dec. 13, 2013 by Xicato, Inc., 10 pages.
Request for Continued Examination mailed on Jul. 28, 2014 for U.S. Appl. No. 14/106,097, filed Dec. 13, 2013 by Xicato, Inc., 10 pages.
Notice of Allowance mailed on Aug. 14, 2014 for U.S. Appl. No. 14/106,097, filed Dec. 13, 2013 by Xicato, Inc., 11 pages.

* cited by examiner

AUTOMATED COLOR TUNING OF AN LED BASED ILLUMINATION DEVICE

CROSS REFERENCE TO RELATED APPLICATIONS

This application claims priority to U.S. application Ser. No. 14/106,097, filed Dec. 13, 2013, which claims priority under 35 USC §119 to U.S. Provisional Application No. 61/738,314, filed Dec. 17, 2012, both of which are incorporated by reference herein in their entireties.

TECHNICAL FIELD

The described embodiments relate to illumination devices that include Light Emitting Diodes (LEDs).

BACKGROUND

The use of light emitting diodes in general lighting is still limited due to limitations in light output level or flux generated by the illumination devices. Illumination devices that use LEDs also typically suffer from poor color quality characterized by color point instability. The color point instability varies over time as well as from part to part. Poor color quality is also characterized by poor color rendering, which is due to the spectrum produced by the LED light sources having bands with no or little power. Further, illumination devices that use LEDs typically have spatial and/or angular variations in the color. Additionally, illumination devices that use LEDs are expensive due to, among other things, the necessity of required color control electronics and/or sensors to maintain the color point of the light source or using only a small selection of produced LEDs that meet the color and/or flux requirements for the application.

Consequently, improvements to illumination device that uses light emitting diodes as the light source are desired.

SUMMARY

The color of light emitted by an assembled light emitting diode (LED) based illumination device with at least two different wavelength converting materials is automatically tuned to within a predefined tolerance of a target color point by modifying portions of the wavelength converting materials. The color of light emitted from the assembled LED based illumination device is measured and a material modification plan is determined based at least in part on the measured color of light and a desired color of light to be emitted. The material modification plan may further include the location of the wavelength converting materials to be modified, which may be based on, e.g., the output beam intensity distribution, color conversion efficiency, a color uniformity, and a temperature distribution over a light emitting surface. The wavelength converting materials are selectively modified in accordance with the material modification plan so that the assembled LED based illumination device emits a second color of light that is within a predetermined tolerance of a target color point. For example, the wavelength converting materials may be selectively modified by removing amounts the wavelength converting materials by laser ablation, mechanical scribing, ion etching, chemical etching, electrical discharge machining, plasma etching, and chemical mechanical polishing or adding amounts of wavelength converting materials by jet dispensing, spray coating, screen printing, and blade coating.

Further details and embodiments and techniques are described in the detailed description below. This summary does not define the invention. The invention is defined by the claims.

DETAILED DESCRIPTION

Reference will now be made in detail to background examples and some embodiments of the invention, examples of which are illustrated in the accompanying drawings.

Figure 1:
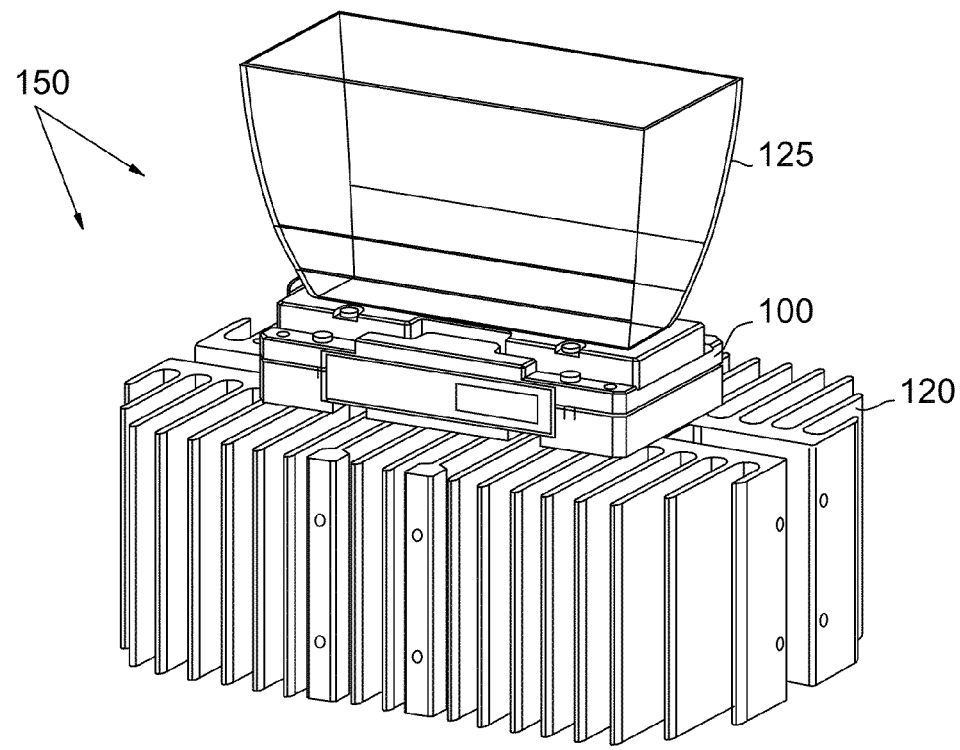
FIGS. 1, 2, and 3 illustrate three exemplary luminaires, including an illumination device, reflector, and light fixture.
Figure 2:
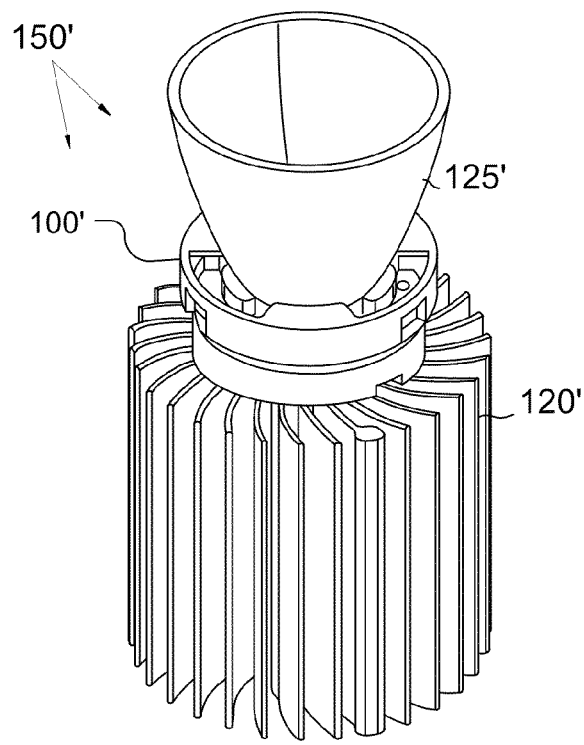
Figure 3:
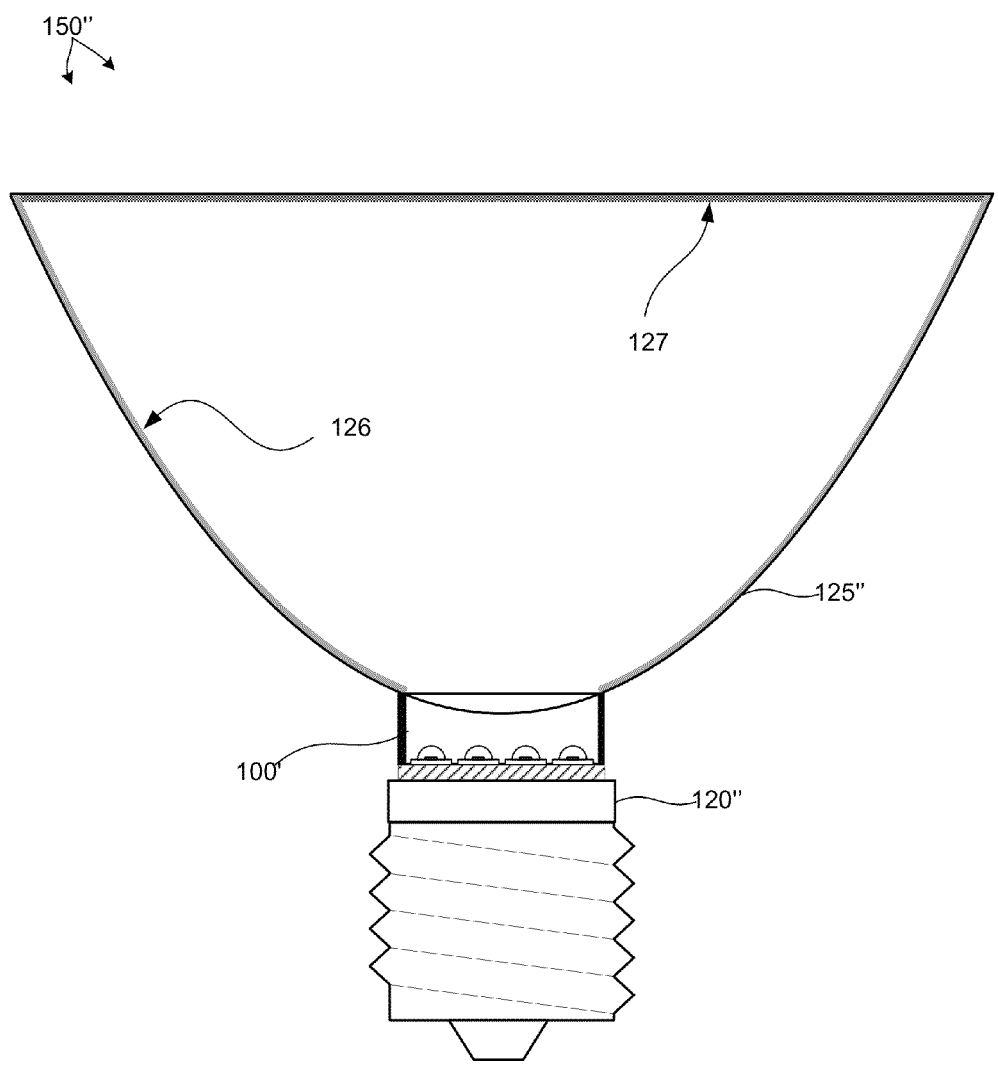

FIGS. 1, 2, and 3 illustrate three exemplary luminaires, labeled 150, 150', and 150", which are sometimes collectively referred to as luminaire 150. The luminaire illustrated in FIG. 1 includes an LED based illumination device 100 with a rectangular form factor. The luminaire illustrated in FIG. 2 includes an LED based illumination device 100' with a circular form factor. The luminaire illustrated in FIG. 3 includes an LED based illumination device 100' integrated into a retrofit lamp device. These examples are for illustrative purposes. Examples of LED based illumination devices of general polygonal and elliptical shapes may also be contemplated, and in general, LED based illumination devices 100 and 100' may be collectively referred to as LED based illumination device 100. As illustrated in FIG. 1, luminaire 150 includes illumination device 100, reflector 125, and light fixture 120. FIG. 2 shows luminaire 150' with illumination device 100', reflector 125', and light fixture 120' and FIG. 3 shows luminaire 150" with illumination device 100', reflector 125", and light fixture 120". Reflectors 125, 125', and 125" are sometimes collectively referred to herein as reflector 125, and light fixtures 120, 120', and 120" are sometimes collectively referred to herein as light fixture 120. As depicted, light fixture 120 includes a heat sink capability, and therefore may be sometimes referred to as heat sink 120. However, light fixture 120 may include other structural and decorative elements (not shown). Reflector 125 is mounted to illumination device 100 to collimate or deflect light emitted from illumination device 100. The reflector 125 may be made from a thermally conductive material, such as a material that includes aluminum or copper and may be thermally coupled to illumination device 100. Heat flows by conduction through illumination device 100 and the thermally conductive reflector 125. Heat also flows via thermal convection over the reflector 125. Reflector 125 may be a compound parabolic concentrator, where the concentrator is constructed of or coated with a highly reflecting material. Optical elements, such as a diffuser or reflector 125 may be removably coupled to illumination device 100, e.g., by means of threads, a clamp, a twist-lock mechanism, or other appropriate arrangement. As illustrated in FIG. 3, a reflector 125 may include sidewalls 126 and a window 127 that are optionally coated, e.g., with a wavelength converting material, diffusing material or any other desired material.

As depicted in FIGS. 1, 2, and 3, illumination device 100 is mounted to heat sink 120. Heat sink 120 may be made from a thermally conductive material, such as a material that includes aluminum or copper and may be thermally coupled to illumination device 100. Heat flows by conduction through illumination device 100 and the thermally conductive heat sink 120. Heat also flows via thermal convection over heat sink 120. Illumination device 100 may be attached to heat sink 120 by way of screw threads to clamp the illumination device 100 to the heat sink 120. To facilitate easy removal and replacement of illumination device 100, illumination device 100 may be removably coupled to heat sink 120, e.g., by means of a clamp mechanism, a twist-lock mechanism, or other appropriate arrangement. Illumination device 100 includes at least one thermally conductive surface that is thermally coupled to heat sink 120, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heat sink contact area should be used. Using a larger heat sink 120 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination device 100.

Figure 4:
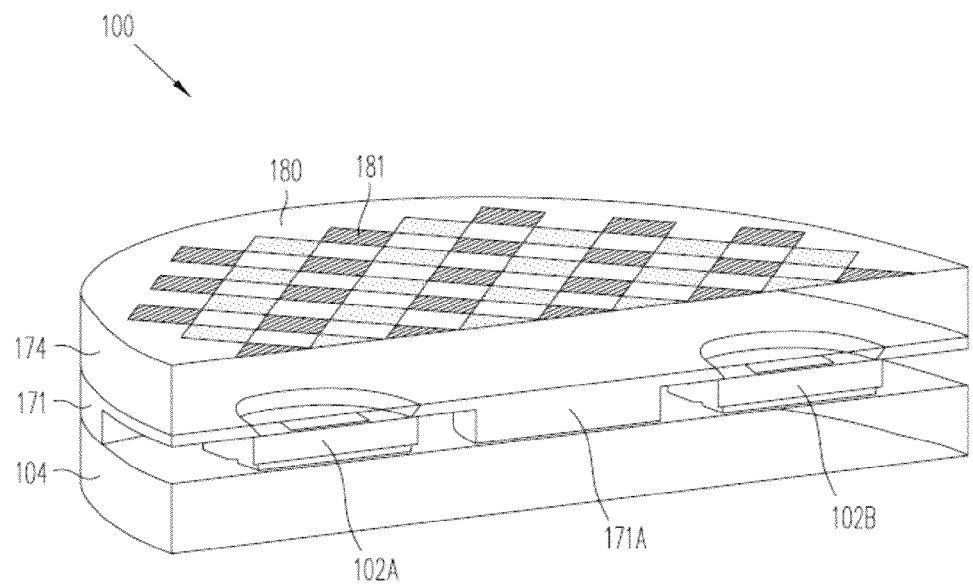
FIG. 4 illustrates a perspective cut-away view of components in an embodiment of an LED based illumination device including a base reflector structure that physically couples a transmissive plate and an LED mounting board.
Figure 5:
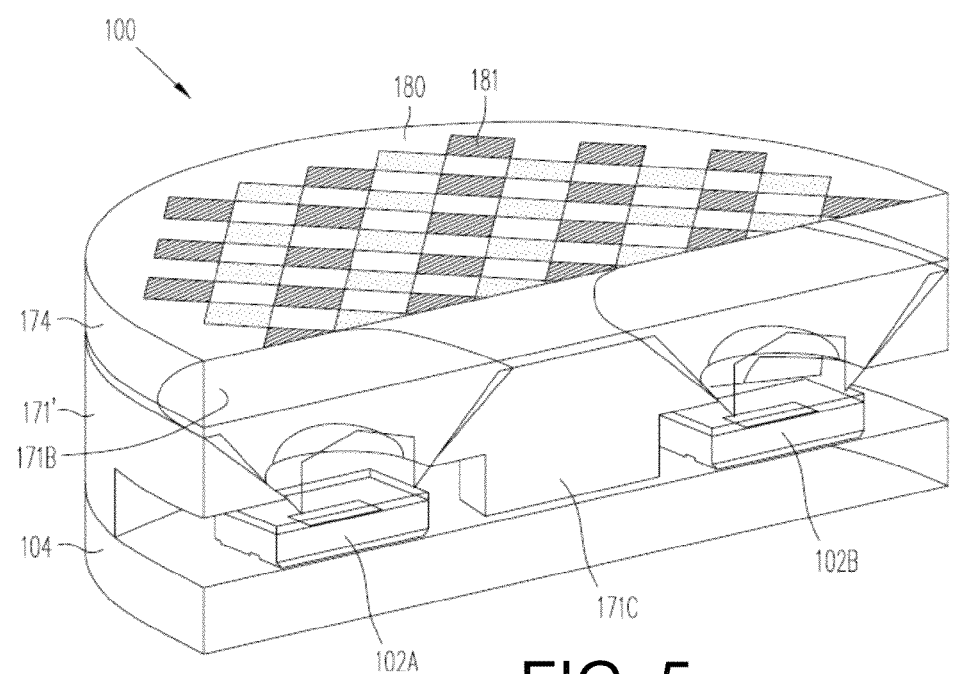
FIG. 5 illustrates a perspective cut-away view of components in another embodiment of an LED based illumination device including a base reflector structure that physically couples a transmissive plate and an LED mounting board.
Figure 6:
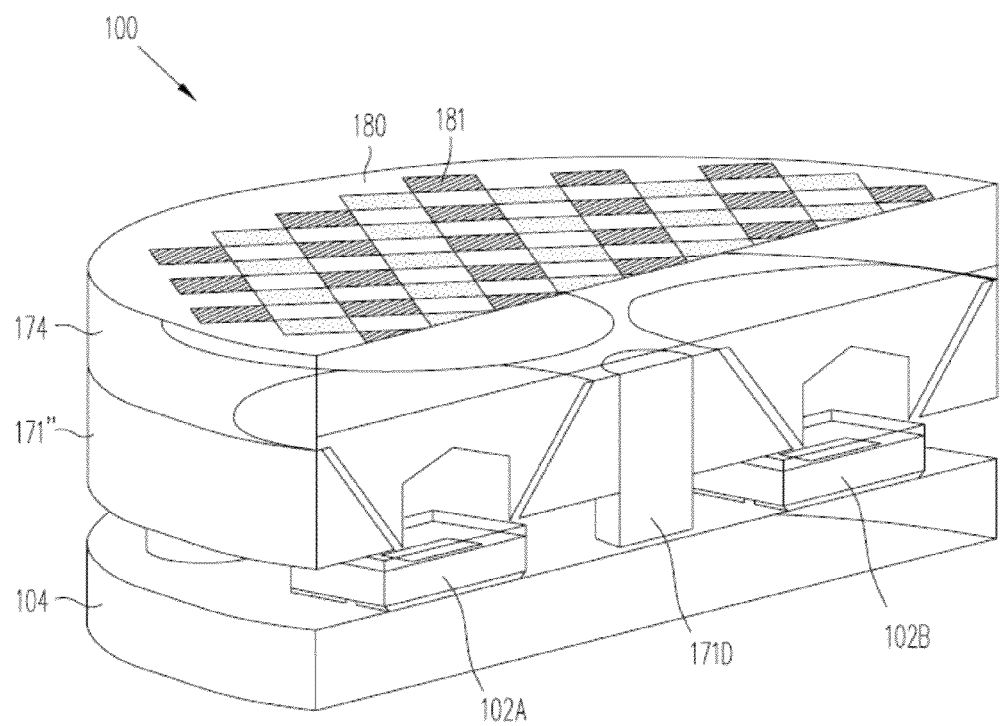
FIG. 6 illustrates a perspective cut-away view of components in another embodiment of an LED based illumination device including a base reflector structure that physically couples a transmissive plate and an LED mounting board.

FIGS. 4, 5, and 6 illustrate perspective cut-away views of components of various embodiments of LED based illumination device 100. It should be understood that as defined herein an LED based illumination device is not an LED, but is an LED light source or fixture or component part of an LED light source or fixture. For example, an LED based illumination device may be an LED based replacement lamp such as depicted in FIG. 3. LED based illumination device 100 includes one or more LED die or packaged LEDs and a mounting board to which LED die or packaged LEDs are attached. In one embodiment, the LEDs 102A and 102B, sometimes referred to herein as LEDs 102 are are packaged LEDs, such as the Luxeon Rebel manufactured by Philips Lumileds Lighting. Other types of packaged LEDs may also be used, such as those manufactured by OSRAM (Oslon package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LED chip typically has a size about 1 mm by 1 mm by 0.5 mm, but these dimensions may vary. In some embodiments, the LEDs 102 may include multiple chips. The multiple chips can emit light of similar or different colors, e.g., red, green, and blue. LEDs 102 are mounted to mounting board 104. The light emitted from LEDs 102 is directed to transmissive plate 174. A thermally conductive base reflector structure 171 promotes heat dissipation from the transmissive plate 174 to the mounting board 104, upon which the LEDs 102 are mounted.

FIG. 5 illustrates LED based illumination device 100 with the base reflector structure 171'. As illustrated, the base reflector structure 171' includes deep reflector surfaces 171B that direct light emitted from LEDs 102 to transmissive plate 174. In addition, base reflector structure 171' includes a centrally located feature 171C that thermally connects transmissive plate 174 and mounting board 104. As illustrated, base reflector structure 171' is constructed from one part to minimize manufacturing complexity.

As illustrated in FIG. 6, base reflector structure 171" includes a thermally conductive insert 171D that thermally couples transmissive plate 174 and mounting board 104. In this manner, base reflector structure may be constructed from a low cost material (e.g., plastic) and the thermally conductive insert 171D may be constructed from a material optimized for thermal conductivity (e.g., aluminum or copper).

As depicted in FIGS. 4-6, base reflector structure 171 is in physical contact with transmissive plate 174 and mounting board 104. However, in some other embodiments, base reflector structure 171 may be in physical contact with transmissive plate 174 and heat sink 120. In this manner, a more direct thermal path between transmissive plate 174 and heat sink 120 is realized. In one example, elements of base reflector structure 171 may be configured to pass through voids in LED board 104 to directly couple transmissive plate 174 to heat sink 120.

Base reflector structure 171 may have a high thermal conductivity to minimize thermal resistance. By way of example, base reflector structure 171 may be made with a highly thermally conductive material, such as an aluminum based material that is processed to make the material highly reflective and durable. By way of example, a material referred to as Miro®, manufactured by Alanod, a German company, may be used.

Figure 7:
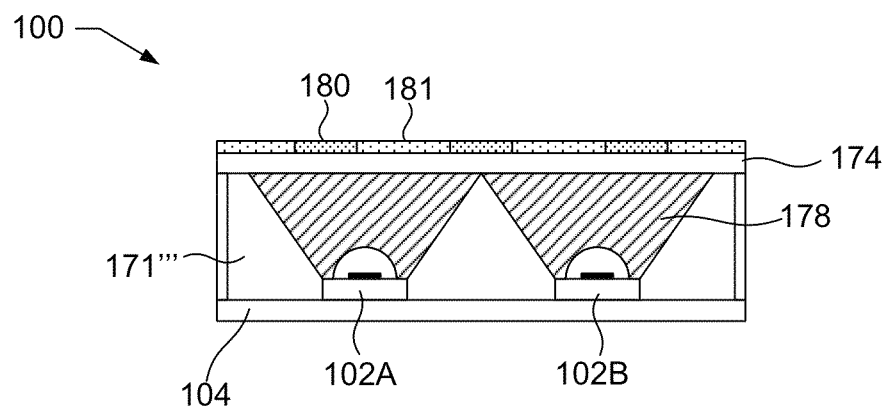
FIG. 7 illustrates a side view of components in another embodiment of an LED based illumination device with a total internal reflection (TIR) lens structure to direct light emitted from LEDs to a transmissive plate.

FIG. 7 is illustrative of another configuration of LED based illumination device 100, which is similar to that shown in FIGS. 4-6, like designated elements being the same. As illustrated in FIG. 7, LED based illumination device 100 may include a total internal reflection (TIR) lens structure 178 to direct light emitted from LEDs 102 to transmissive plate 174.

Figure 8:
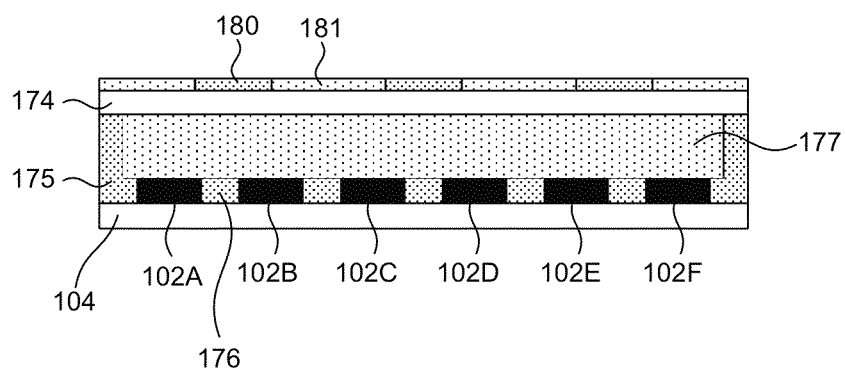
FIG. 8 illustrates a side view of components in another embodiment of an LED based illumination device with a dam of reflective material surrounding the LEDs and supporting a transmissive plate.

FIG. 8 is illustrative of another configuration of LED based illumination device 100, which is similar to that shown in FIGS. 4-6, like designated elements being the same. As illustrated in FIG. 8, LED based illumination device 100 includes a number of LEDs 102A-F, collectively referred to as LEDs 102, arranged in a chip on board (COB) configuration. LED based illumination device 100 also includes a base reflector structure including a reflective material 176 disposed in the spaces between each LED and a dam of reflective material 175 that surrounds the LEDs 102 and supports transmissive plate 174. In some examples, reflective materials 175 and 176 are a white, reflective silicone-based material. In the embodiment depicted in FIG. 8, the space between LEDs 102 and transmissive plate 174 is filled with an encapsulating optically translucent material 177 (e.g., silicone) to promote light extraction from LEDs 102 and to separate LEDs 102 from the environment.

Figure 9:
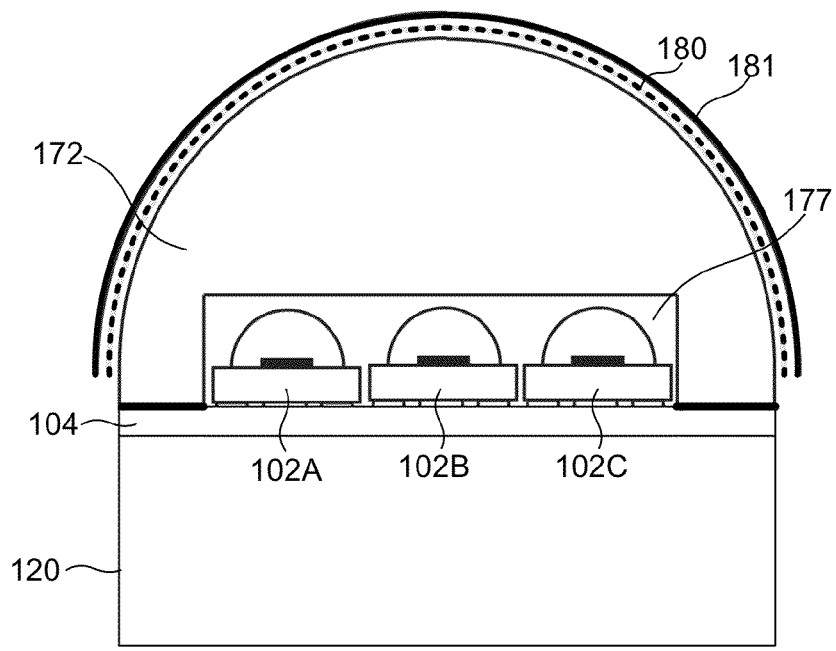
FIG. 9 illustrates a side view of components in another embodiment of an LED based illumination device with a shaped lens disposed over the LEDs and thermally coupled to the LED mounting board.

FIG. 9 is illustrative of another configuration of LED based illumination device 100, which is similar to that shown in FIGS. 4-6, like designated elements being the same. As illustrated, LED based illumination device 100 includes a shaped lens 172 disposed over LEDs 102A, 102B, and 102C, collectively referred to as LEDs 102. As illustrated, shaped lens 172 includes at least one wavelength converting material at the light emitting surface of shaped lens 172. Shaped lens 172 is directly coupled to mounting board 104 to promote heat flow from shaped lens 172 to mounting board 104. In this manner, heat generated by color conversion on surfaces of shaped lens 172 is efficiently transferred to mounting board 104 and removed from LED based illumination device 100 via heat sink 120. In some other embodiments, shaped lens 172 is directly coupled to heat sink 120.

The optical surfaces of base reflector structure 171 may be treated to achieve high reflectivity. For example the optical surface of base reflector structure 171 may be polished, or covered by one or more reflective coatings (e.g., reflective materials such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan), a polytetrafluoroethylene PTFE material such as that manufactured by W.L. Gore (USA) and Berghof (Germany)). Also, highly diffuse reflective coatings can be applied to optical surfaces of base reflector structure 171. Such coatings may include titanium dioxide (TiO2), zinc oxide (ZnO), and barium sulfate (BaSO4) particles, or a combination of these materials.

In some embodiments, base reflector structure 171 may be constructed from or include a reflective, ceramic material, such as ceramic material produced by CerFlex International (The Netherlands). In some embodiments, portions of any of the optical surfaces of base reflector structure 171 may be coated with a wavelength converting material.

LEDs 102 can emit different or the same colors, either by direct emission or by phosphor conversion, e.g., where phosphor layers are applied to the LEDs as part of the LED package. The illumination device 100 may use any combination of colored LEDs 102, such as red, green, blue, amber, or cyan, or the LEDs 102 may all produce the same color light. Some or all of the LEDs 102 may produce white light. In addition, the LEDs 102 may emit polarized light or non-polarized light and LED based illumination device 100 may use any combination of polarized or non-polarized LEDs. In some embodiments, LEDs 102 emit either blue or UV light because of the efficiency of LEDs emitting in these wavelength ranges. The light emitted from the illumination device 100 has a desired color when LEDs 102 are used in combination with wavelength converting materials on transmissive plate 174 or shaped lens 172, for example. By tuning the chemical and/or physical (such as thickness and concentration) properties of the wavelength converting materials and the geometric properties of the coatings on the surfaces of transmissive plate 174 or shaped lens 172, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

In some examples, a wavelength converting material is a phosphor or mixture of different phosphors. By way of example, phosphors may be chosen from the set denoted by the following chemical formulas: Y3Al5O12:Ce, (also known as YAG:Ce, or simply YAG) (Y,Gd)3Al5O12:Ce, CaS: Eu, SrS:Eu, SrGa2S4:Eu, Ca3(Sc,Mg)2Si3O12:Ce, Ca3Sc2Si3O12:Ce, Ca3Sc2O4:Ce, Ba3Si6O12N2:Eu, (Sr, Ca)AlSiN3:Eu, CaAlSiN3:Eu, CaAlSi(ON)3:Eu, Ba2SiO4: Eu, Sr2SiO4:Eu, Ca2SiO4:Eu, CaSc2O4:Ce, CaSi2O2N2: Eu, SrSi2O2N2:Eu, BaSi2O2N2:Eu, Ca5(PO4)3Cl:Eu, Ba5 (PO4)3Cl:Eu, Cs2CaP2O7, Cs2SrP2O7, Lu3Al5O12:Ce, Ca8Mg(SiO4)4Cl2:Eu, Sr8Mg(SiO4)4Cl2:Eu, La3Si6N11: Ce, Y3Ga5O12:Ce, Gd3Ga5O12:Ce, Tb3Al5O12:Ce, Tb3Ga5O12:Ce, and Lu3Ga5O12:Ce.

In one example, the adjustment of color point of the illumination device may be accomplished by adding or removing wavelength converting material from transmissive plate 174 or shaped lens 172, which similarly may be coated or impregnated with one or more wavelength converting materials. In one embodiment a red emitting phosphor 181 such as an alkaline earth oxy silicon nitride covers a portion of transmissive plate 174 or shaped lens 172, and a yellow emitting phosphor 180 such as YAG covers another portion of transmissive plate 174 or shaped lens 172, as illustrated in FIGS. 4-9.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174 or shaped lens 172, and selecting which portions of transmissive plate 174 or shaped lens 172 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174 or shaped lens 172. By way of example, a red emitting phosphor 181 may be patterned on different areas of the transmissive plate 174 or shaped lens 172 and a yellow emitting phosphor 180 may be patterned on other areas of transmissive plate 174 or shaped lens 172. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 102 varies. The color performance of the LEDs 102, red phosphor and the yellow phosphor may be measured and modified by any of adding or removing phosphor material based on performance so that the final assembled product produces the desired color temperature.

Transmissive plate 174 and shaped lens 172 may be constructed from a suitable optically transmissive material (e.g., sapphire, alumina, crown glass, polycarbonate, and other plastics).

Figure 10:
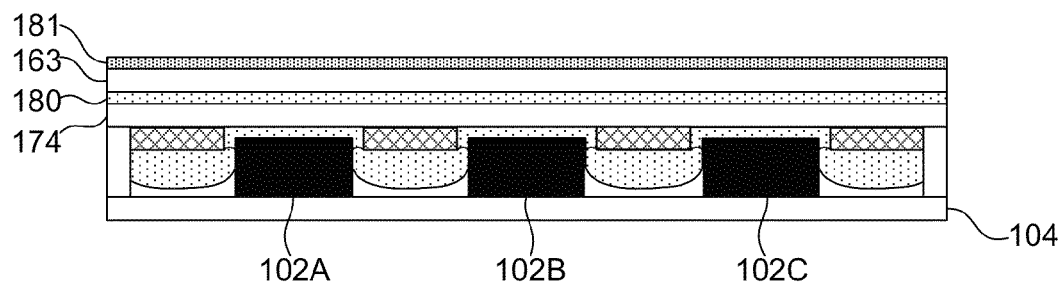
FIG. 10 illustrates a side view of components in another embodiment of an LED based illumination device with multiple transmissive plates.

In some embodiments, multiple, stacked transmissive layers are employed. Each transmissive layer includes different wavelength converting materials. For example, as illustrated in FIG. 10, transmissive layer 174 includes wavelength converting material 180 over the surface area of transmissive layer 174. In addition, a second transmissive layer 163 is placed over and in contact with transmissive layer 174. Transmissive layer 163 includes wavelength converting material 181. Although, as illustrated in FIG. 10, transmissive layer 163 is placed over and in contact with transmissive layer 174, a space may be maintained between the two elements. This may be desirable to promote cooling of the transmissive layers. For example, airflow may by introduced through the space to cool the transmissive layers.

Figure 11:
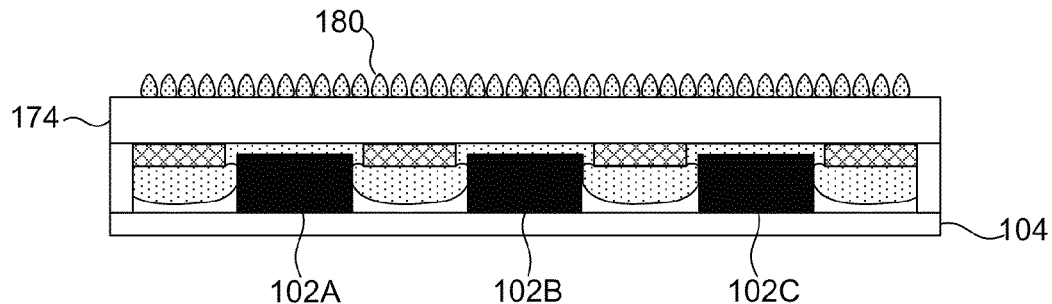
FIG. 11 illustrates a side view of components in another embodiment of an LED based illumination device with droplets of a wavelength converting material uniformly applied to the surface of transmissive layer.

In some embodiments, any of the wavelength converting materials may be applied as a pattern (e.g., stripes, dots, blocks, droplets, etc.). For example, as illustrated in FIG. 11, droplets of wavelength converting material 180 are uniformly applied to the surface of transmissive layer 174. Shaped droplets may improve extraction efficiency by increasing the amount of surface area of the droplet.

Figure 12:
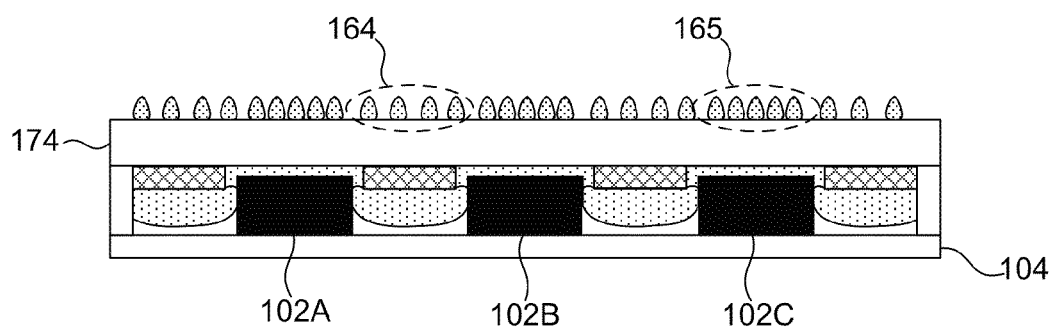
FIG. 12 illustrates a side view of components in another embodiment of an LED based illumination device with droplets of a wavelength converting material applied to the surface of transmissive layer in a non-uniform pattern.

As illustrated in FIG. 12, in some embodiments, droplets of wavelength converting material 180 may be spaced on transmissive layer 174 in a non-uniform pattern. For example, a group of droplets 165 located over LED 102C is densely packed (e.g., droplets in contact with adjacent droplets), while a group of droplets 164 located over a space between LEDs 102A and 102B is loosely packed (e.g., droplets spaced apart from adjacent droplets). In this manner, the color point of light emitted from LED based illumination device 100 may be tuned by varying the packing density of droplets on transmissive layer 174.

Figure 13:
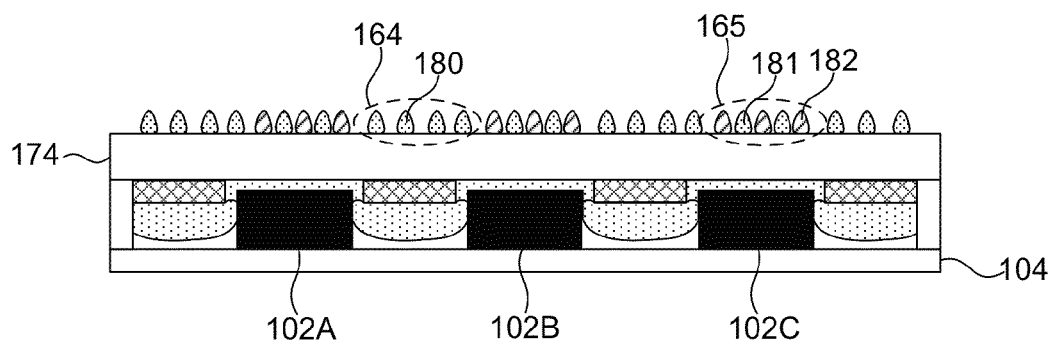
FIG. 13 illustrates a side view of components in another embodiment of an LED based illumination device with droplets of different wavelength converting materials applied to the surface of transmissive layer in a non-uniform pattern.

As illustrated in FIG. 13, in some embodiments, droplets of different wavelength converting materials may be placed in different locations of transmissive layer 174 and may also be placed in a non-uniform pattern. For example, group of droplets 164 may include wavelength converting material 180 and group of droplets 165 may include a combination of droplets including wavelength converting material 181 and wavelength converting material 182. In this manner, combinations of different wavelength converting materials are located relative to LEDs 102 in varying densities to achieve a desired color point of light emitted from LED based illumination device 100.

In the illustrated embodiments, wavelength converting materials are located on the surface of transmissive layer 174. However, in some other embodiments, any of the wavelength converting materials may be embedded within transmissive layer 174, on the side of transmissive layer 174 facing LEDs 102, or any combination thereof.

The area between LEDs 102 and transmissive plate 174 or shaped lens 172 may be filled with a non-solid material, such as air or an inert gas, so that the LEDs 102 emit light into the non-solid material. By way of example, the cavity may be hermetically sealed and Argon gas used to fill the cavity. Alternatively, Nitrogen may be used. In other embodiments, the area between LEDs 102 and transmissive plate 174 or shaped lens 172 may be filled with a solid encapsulate material. By way of example, silicone may be used to fill the cavity. In some other embodiments, color conversion cavity 160 may be filled with a fluid to promote heat extraction from LEDs 102. In some embodiments, wavelength converting material may be included in the fluid to achieve color conversion.

With two or more of wavelength converting materials, each with different wavelength converting properties, the LED based illumination device 100 may produce a predetermined or target color point with a high degree of accuracy.

Figure 17:
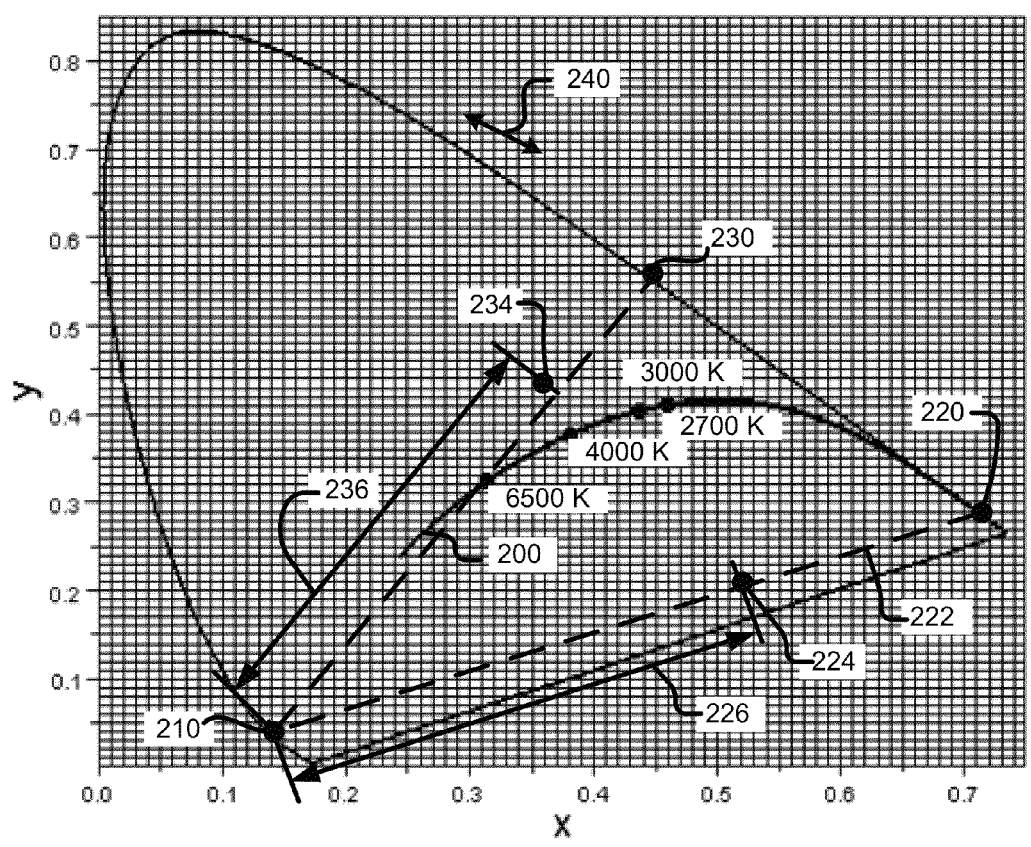
FIG. 17 is illustrative of a (xy) chromaticity diagram based on the CIE 1931 XYZ color space.

FIG. 17 is illustrative of a (xy) chromaticity diagram based on the CIE 1931 XYZ color space. The CIE 1931 color space is based on three color matching functions. The three tristimulus values express the CIE 1931 XYZ color space as a three dimensional color space. Each color matching function relates a given spectrum, $S(\lambda)$, to each of the three tristimulus values, X, Y, and Z, as described in equation (1).

$$X_{1931} = \int CMF_X S(\lambda) d\lambda$$

$$Y_{1931} = \int CMF_Y S(\lambda) d\lambda$$

$$Z_{1931} = \int CMF_Z S(\lambda) d\lambda \qquad (1)$$

The xy chromaticity diagram of FIG. 17 is a projection of the three dimensional CIE 1931 XYZ color space onto a two dimensional space (xy) such that brightness is ignored. Each color coordinate (x,y) may be expressed as a function of the three tristimulus values as described in equation (2).

$$x = \frac{X}{X+Y+Z} \qquad (2)$$

$$y = \frac{Y}{X+Y+Z}$$

There are other color spaces that are simple projective transformations of the CIE 1931 XYZ color space. For example, both the CIE 1960 uniform color scale (CIE 1960 UCS) and the CIE 1976 uniform color scale (CIE 1976 UCS)

are simple transformations of the CIE 1931 XYZ color space. The CIE 1960 UCS expresses two dimensional chromaticity (uv) as a function of the three tristimulus values as described in equation (3).

$$u = \frac{4X}{X + 15Y + 3Z}$$
$$v = \frac{6Y}{X + 15Y + 3Z}$$
(3)

The CIE 1976 UCS expresses two dimensional chromaticity (u'v') as a function of the three tristimulus values as described in equation (4).

$$u' = \frac{4X}{X + 15Y + 3Z}$$
$$v' = \frac{9Y}{X + 15Y + 3Z}$$
(4)

Figure 18:
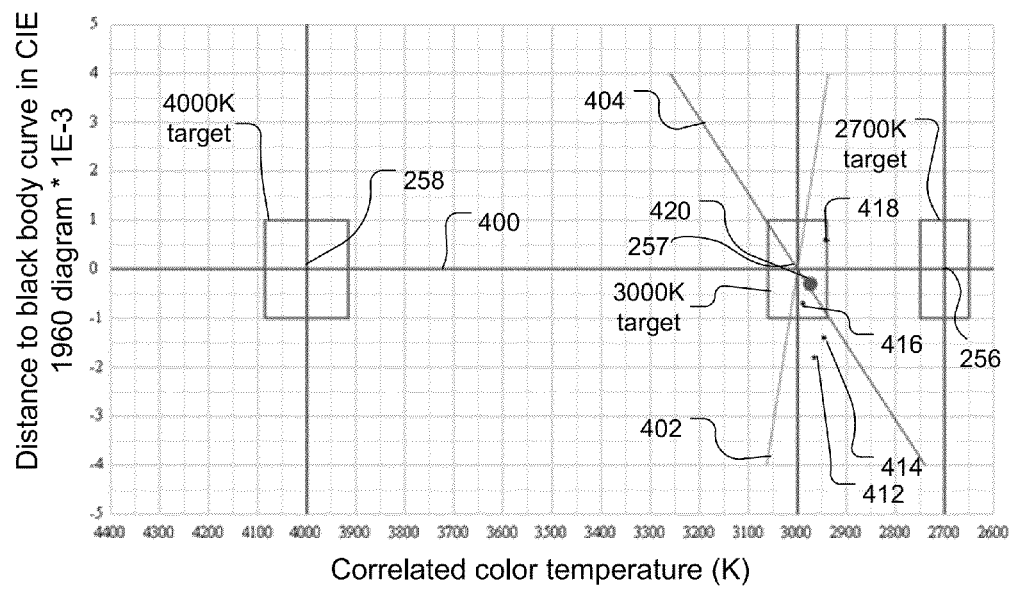
FIG. 18 is a diagram illustrating color points of LED devices and predetermined target color points on the black-body curve from the CIE 1960 UCS diagram where the horizontal axis represents CCT and the vertical axis represents the degree of departure (Δuv) from the black-body curve.

The CIE 1960 UCS color space has generally been superseded by the CIE 1976 UCS color space as an expression of uniform chromaticity. However, the CIE 1960 UCS color space is still useful as an expression of chromaticity because the isothermal lines of correlated color temperature (CCT) are aligned perpendicular to the Planckian locus in CIE 1960 UCS. In the context of the CIE 1960 UCS, the degree of departure is the distance between the color point of the light produced by the light source and the Planckian locus along a line of constant CCT. The degree of departure is referred to in units of Δuv in CIE 1960 UCS. Thus, the color point of a white light source may be described as a CCT value and a Δuv value, i.e., the degree of departure from the black-body curve as measured in the CIE 1960 color space. It follows that the specification for color of light output by LED based illumination device 100 can be expressed as a CCT value within a predetermined tolerance and a Δuv value within a predetermined tolerance. FIG. 18 illustrates a plot of the black-body curve 400, sometimes referred to as a Planckian locus, parallel to the horizontal axis and units of Δuv along the vertical axis in the context of the CIE 1960 chromaticity diagram. Target color points 256-258 are illustrated as exemplary target color points. The degree of departure from the target color point is referred to in units of Δuv. When the color point of a light source varies significantly from a predetermined target color point, the color of the light will be perceptively different from the desired color. Moreover, when light sources are near each other, e.g., in accent lighting or a display, even slight color differences are noticeable and considered undesirable.

Producing light sources that generate light near a target color point is desirable. For example, when used for purposes of general illumination, it is desirable that the LED based illumination device 100 produce white light with a particular correlated color temperature (CCT). CCT relates to the temperature of a black-body radiator and temperatures between 2700K and 6000K are typically useful for general illumination purposes. Higher color temperatures are considered "cool" as they are bluish in color, while lower temperatures are considered "warm" as they contain more yellow-red colors. By way of example, CCTs of 2700K, 3000K, 3500K, 4000K, 4200K, 5000K, 6500K are often desirable. In another example, light emitted from an LED based illumination device targeting any of CIE illuminant series A, B, C, D, E, and F are desirable.

As illustrated in FIG. 17, the chromaticity of a black-body radiator in CIE 1931 color space is represented by curve 200. This curve is sometimes referred to as the Planckian locus. Ideally, light sources produce light that lies on the black-body curve 200 at a target color point. In practice, however, producing light at a target color point on the black-body curve 200 is difficult, particularly with an LED light source because of the lack of precise control over the light output of an LED light source manufactured using current processes. Typically, there will be some distance between the color point of the light produced by the light source and the target color point on the black-body curve 200, which is known as the degree of departure from the target color point on the black-body curve.

An LED is typically binned after a production run based on a variety of characteristics derived from its spectral power distribution. The cost of the LEDs is determined by the size (distribution) of the bin. For example, a particular LED may be binned based on the value of its peak wavelength. The peak wavelength of an LED is the wavelength where the magnitude of its spectral power distribution is maximal. Peak wavelength is a common metric to characterize the color aspect of the spectral power distribution of blue LEDs. Many other metrics are commonly used to bin LEDs based on their spectral power distribution (e.g. dominant wavelength, xy color point, uv color point, etc.). It is common for blue LEDs to be separated for sale into bins with a range of peak wavelength of five nanometers.

As discussed above, LED based illumination device 100 includes a board 104 with a plurality of LEDs 102. The plurality of LEDs 102 populating board 104 are operable to produce light with a particular spectral power distribution. The color aspect of this spectral power distribution may be characterized by its centroid wavelength. A centroid wavelength is the wavelength at which half of the area of the spectral power distribution is based on contributions from wavelengths less than the centroid wavelength and the other half of the area of the spectral power distribution is based on contributions from wavelengths greater than the centroid wavelength. For a plurality of boards, a standard deviation of the centroid wavelength can be calculated. In some production examples a standard deviation of the centroid wavelength of a plurality of boards may be less than 0.1 nm, e.g., where the boards are populated with LEDs carefully selected for their closely matching spectral power distribution or LEDs from a small bin. Of course, costs increase significantly when producing boards with a standard deviation of the centroid wavelength of approximately 0.1 nm or less. In other examples, a standard deviation of the centroid wavelength of a plurality of boards may be less than 0.5 nm. In yet other examples, a standard deviation of the centroid wavelength of a plurality of boards may be less than 2.0 nm.

The LED based illumination device 100 can accommodate LEDs with a wide spectral power distribution while still achieving a target color point within a predetermined tolerance. Moreover, multiple LED devices 100 may be produced, each with one or more LEDs having different spectral power distributions, e.g., a large standard deviation of the centroid wavelength, while still achieving closely matched color points from one LED based illumination device 100 to the next, and where the matching color points of the LED devices 100 are within a predetermined tolerance from a target color point. Thus, less expensive LEDs may be used. By using two or more wavelength converting materials, the color point of the light emitted by the LED based illumination device 100 may be accurately controlled. In one aspect, the amounts of the two or more wavelength converting materials may be modified based on a color measurement of an assembled LED based illumination device such that the modified LED based illumination device emits light within a predetermined tolerance of a target color point. The amounts of the wavelength converting materials may be modified to produce a desired degree of departure of Δu'v' between 0.009 and 0.0035 and smaller if desired, such as 0.002.

Figure 14:
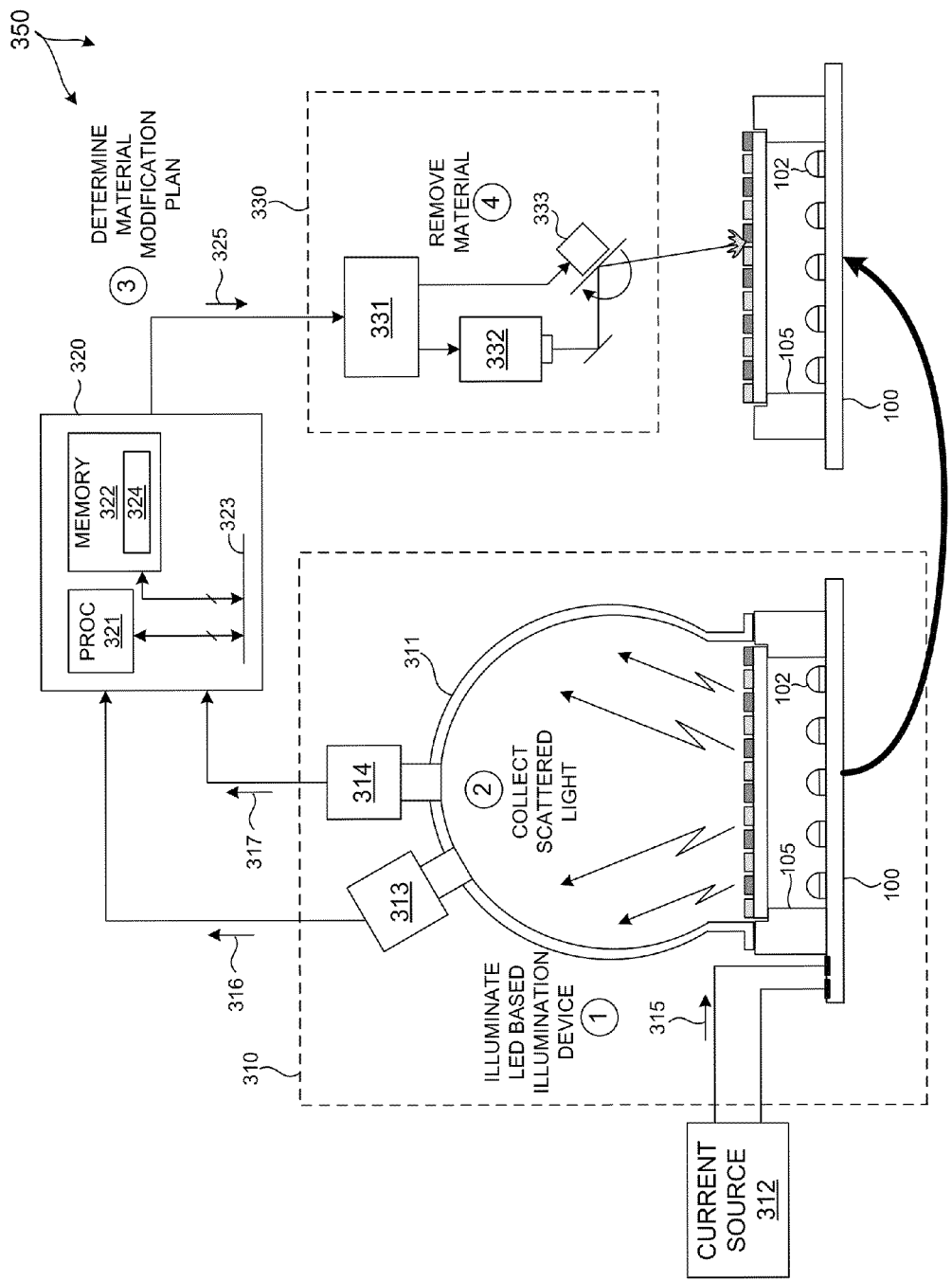
FIG. 14 is illustrative of a system for automatically tuning the color of light emitted from an assembled LED based illumination device within a predefined tolerance of a target color point by removing portions of two different wavelength converting materials.

FIG. 14 is illustrative of a system 350 for automatically tuning the color of light emitted from an assembled LED based illumination device 100 within a predefined tolerance of a target color point by removing portions of two different wavelength converting materials. Although, as illustrated, system 350 automatically tunes LED based illumination device 100 by removal of wavelength converting material, system 350 may also be configured to tune LED based illumination device 100 by addition of wavelength converting materials.

System 350 includes an optical detection system 310, a material modification planning tool 320, and a material modification system 330. In the embodiment illustrated in FIG. 14, optical detection system 310 includes an integrating sphere 311 and a spectrometer 313. In addition, optical detection system 310 includes an optional camera system 314 to image the light emitted from the surface of LED based illumination device 100. Optical detection system 310 is configured to measure the color of light emitted from an LED based illumination device 100 under test. Although an integrating sphere 311 and spectrometer 313 may be employed to measure the color of light emitted from an LED based illumination device 100, other measurement devices may be contemplated. For example, light emitted from LED based illumination device 100 may be filtered by three color filters, each configured to mimic the CIE color matching functions. After filtering, light detected by a photometer may be used to determine the three tristimulus values described with reference to Equation 1. Other exemplary color measurement techniques may be contemplated.

Material modification planning tool 320 includes a processor 321 and an amount of processor readable memory 322. In the illustrated example, processor 321 and memory 322 are configured to communicate over a bus 323. Memory 322 includes an amount of memory 324 storing instructions that, when executed by processor 321, implement material modification planning functionality as described herein.

In the illustrated embodiment, material modification system 330 includes a controller 331, a laser light source 332, and a galvo scanner 333. Based on a material modification plan generated by material modification planning tool 320, controller 331 controls laser 332 and galvo scanner 333 to direct radiation emitted from laser 332 to LED based illumination device 100. The incident radiation ablates a portion of a first wavelength converting material and a portion of a second wavelength converting material such that the modified LED based illumination device 100 emits colored light within a predetermined tolerance of a target color point. In addition to the illustrated embodiment, other material modification systems 330 may be contemplated. For example, a laser based ablation system may employ a variety of motion control schemes to precisely direct laser light onto LED based illumination device 100. For example, a motion system may be used to move the LED based illumination device in one direction and the laser in an orthogonal direction in a coordinated manner. Such a motion system may be employed to precisely direct laser light alone or in combination with a scanning mirror system. In some other examples, material modification system 330 may be a mechanical scribing system that mechanically removes material from LED based illumination device. Material modification systems 330 based on ion etching, chemical etching, electrical discharge machining, plasma etching, and chemical mechanical polishing may also be contemplated.

In some other examples, material modification system 330 may add material to LED based illumination device 100 to precisely modify the amounts of two different wavelength converting materials. By way of example, jet dispensing, spray coating, screen printing, and blade coating may be employed to precisely add at least two different wavelength converting materials to LED based illumination device 100 to tune the color of light emitted from LED based illumination device 100 within a predetermined tolerance of a target color point.

Figure 16:
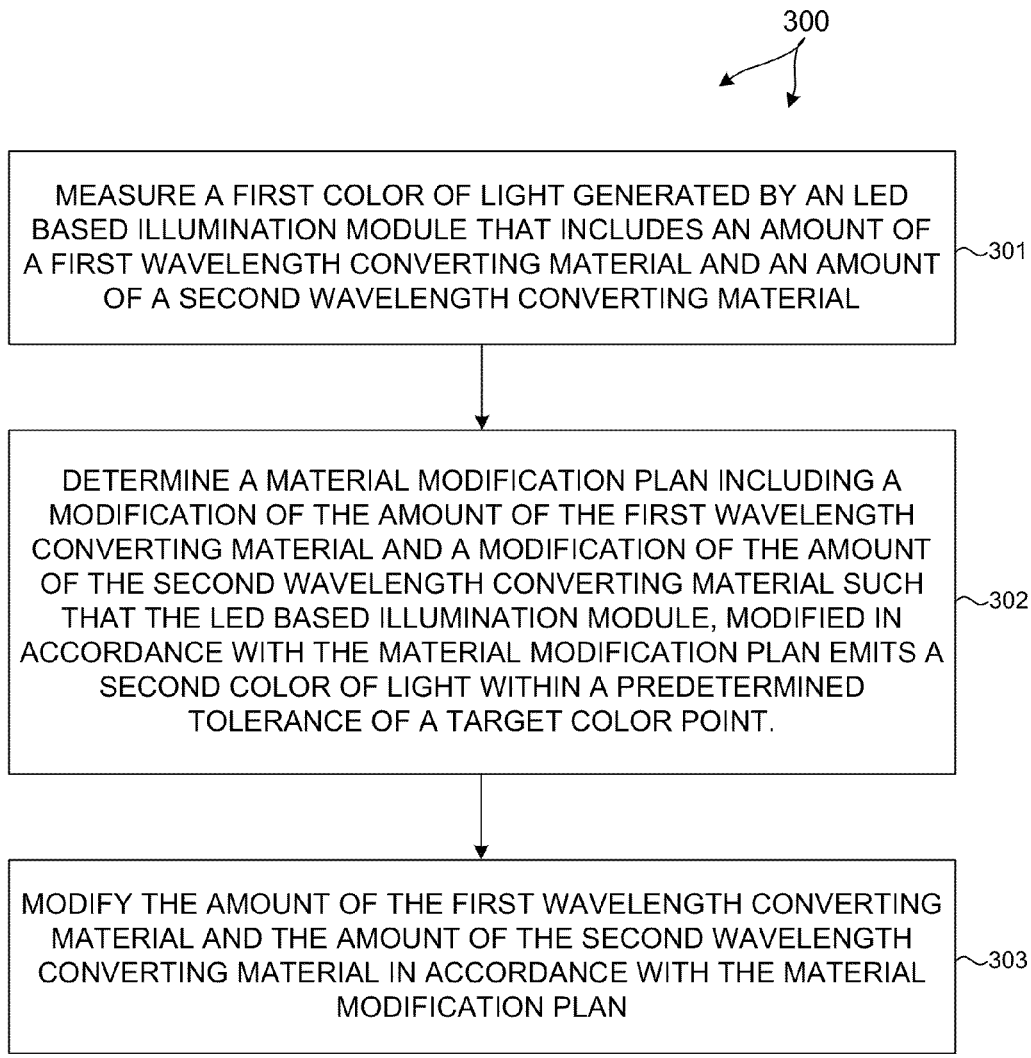
FIG. 16 illustrates a method of automatically tuning the color of light emitted from an assembled LED based illumination device within a predefined tolerance of a target color point by modifying portions of at least two different wavelength converting materials.

FIG. 16 illustrates a method 300 of automatically tuning the color of light emitted from an assembled LED based illumination device 100 within a predefined tolerance of a target color point by modifying portions of at least two different wavelength converting materials. For illustrative purposes, method 300 is described with reference to system 350 illustrated in FIG. 14. However, the execution of the elements of method 300 is not limited to the specific embodiments described with reference to FIG. 14.

In block 301, the color of light emitted by LED based illumination device 100 is measured. LED based illumination device 100 includes two different wavelength converting materials. As illustrated in FIG. 14, an electrical power source (e.g., current source 312) supplies electrical power (e.g., current 315) to LED based illumination device 100. In response LED based illumination device 100 emits light having a first color. The emitted light is collected by integrating sphere 311. By collecting the light in integrating sphere 311, the sample of light collected by spectrometer 313 effectively represents an averaged color of light emitted from LED based illumination device 100. Spectrometer 313 is configured to determine the color of light emitted by LED based illumination device 100 and communicate a signal 316 indicative of the measured color to material modification planning tool 320.

In block 302, material modification planning tool 320 determines a material modification plan that includes a modification of the amount of a first wavelength converting material and a modification of the amount of the second wavelength converting material. As modified, the LED based illumination device will emit light with a changed color point that is within a predetermined tolerance of a target color point.

The color point shifts associated with each of the wavelength converting materials is illustrated in the CIE 1931 chromaticity diagram of FIG. 17. The color point of the test light source, which produces blue light at, e.g., 445 nm, is illustrated as point 210 in the diagram. The color point produced by, e.g., wavelength converting material 180 on or within transmissive plate 174 is illustrated as point 220, which corresponds with a dominant wavelength of, e.g., 630 nm. The color point shift produced by wavelength converting material 180 with the test light source is along the dotted line 222, where the amount of the shift will depend on the geometry of the LED based illumination device 100 and the thickness and/or concentration of the wavelength converting material 180 on the transmissive plate 174. By way of example, the measured color point produced by wavelength converting material 180 is illustrated by point 224 and the shift Δxy from the color point produced by the test light source without wavelength converting material 180 (e.g., point 210) is illustrated by line 226.

The color point produced by, e.g., the wavelength converting material 181 on or within transmissive plate 174, is illustrated as point 230 which corresponds with a dominant wavelength of, e.g., 570 nm. The color point shift produced by wavelength converting material 181 with the test light source is along the dotted line 232 depending on the thickness and/or concentration of the wavelength converting material 181 on the transmissive plate 174. By way of example, the measured color point produced by wavelength converting material 181 with the test light source is illustrated by point 234 and the shift Δxy from the color point produced by the test light source without wavelength converting material 181 (e.g., point 210) is illustrated by line 236. If desired, different formulations of the wavelength converting materials may also be used, which would alter the color point produced by the wavelength converting materials (as illustrated by arrow 240), and thus, the slope of the color point shift.

Typically, there is a difference in spectral power distribution from one LED to the next. For example, LEDs that are supposed to produce blue light at 452 nm will typically produce light that may range between 450 nm and 455 nm or more. In another example, LEDs that are supposed to produce blue light may produce light that ranges between 440 nm and 475 nm. In this example, the spectral power distribution from one LED to another may be as much as eight percent. The variation in the spectral power distribution of LEDs is one of the reasons why producing LED based light sources with consistent and accurate color points is difficult. However, because the LED based illumination device 100 includes two or more wavelength converting components with wavelength converting materials that can be individually modified, appropriate wavelength converting characteristics can be tuned for a large variation of spectral power distributions of LEDs 102 to produce a color point that is within a predetermined tolerance, e.g., a Δu'v' of less than 0.0035, from a target color point. The target color point may be, e.g., a CCT of 2700K, 3000K, 4000K, or other temperature on the black-body curve, or alternatively, the target color point may be off of the black-body curve.

FIG. 18 is a diagram illustrating color points of LED devices and predetermined target color points on the black-body curve from the CIE 1960 UCS diagram where the horizontal axis represents CCT and the vertical axis represents the degree of departure (Δuv) from the black-body curve 400. The target color points may be, e.g., 4000K, 3000K and 2700K on the black-body curve 400. Other target CCTs or color points off of the black-body curve 400 may be used if desired. FIG. 18 illustrates a predetermined tolerance for each of the target color points with a rectangle. For example, at the target color point at 4000K the CCT may vary by ±90K, while at 3000K the CCT may vary by ±55K, and at 2700K the CCT may vary by ±50K. These predefined tolerances for CCT are within a two step MacAdam ellipse centered on each respective target color point on the black-body curve. The predetermined tolerance for the departure from the black-body curve Δuv for each CCT is ±0.001. In this example, Δuv may vary by a distance of 0.001 above the black-body curve 400 (expressed as a positive tolerance value, +0.001) and may vary by a distance of 0.001 below the black-body curve 400 (expressed as a negative tolerance value, −0.001). This predetermined tolerance for Δuv is within a one step MacAdam ellipse centered on each respective target color point on the black-body curve. The predetermined tolerances for CCT and Δuv illustrated in FIG. 18 is within a two step MacAdam ellipse and also within the tolerance of Δu'v' of 0.0035. The color points within the illustrated tolerance from the target color points are so close that the color difference is indistinguishable for most people even when the light sources are viewed side by side.

The diagram illustrates two color lines centered on the 3000K CCT for reference purposes. One color line 402 corresponds to the color point shift produced by a first wavelength converting material. In the present example, color line 402 is a yellow phosphor coating on the transmissive plate 174. Color line 404 corresponds to the color point shift produced by a second wavelength converting material. In the present example, color line 404 is a red phosphor coating on the transmissive plate 174. Color line 402 indicates the direction of a shift in color point of light produced by the yellow phosphor. Color line 404 indicates the direction of shift in color point produced by the red phosphor. The first wavelength converting material and the second wavelength converting material are selected such that their respective directions of shift in color point are not parallel. Because the direction of shift of the yellow phosphor and the red phosphor are not parallel, the direction of the color point shift of light emitted by LED based illumination device 100 can be arbitrarily designated. This may be achieved by modifying the amount of each phosphor as discussed above. By way of example, the small spots, 412, 414, 416, and 418 graphically illustrate the color points produced by one LED based illumination device 100 using different amounts of wavelength converting materials. For example, spot 412 illustrates the color point for the LED based illumination device 100 with one set of amounts of the two different wavelength converting materials. By modifying the amount of yellow phosphor, the color point shifted for the LED based illumination device 100 to spot 414. As can be seen, the difference in the color points from spot 412 to 414 is parallel with the color line 402. By modifying the amount of red phosphor, the color shifts from spot 414 to spot 416 which is parallel with the color line 404. While this is within the 3000K target, an additional modification of the amount of yellow phosphor results in a color point illustrated by spot 418, where the shift between spot 416 and 418 is parallel with the color line 402. By again modifying the amount of yellow phosphor the color point of the LED based illumination device 100 shifts along line 402 to produce a color point illustrated by large spot 420, which is well within the predetermined tolerance from the target color point of 3,000K on the black-body curve.

Material modification planning tool 320 determines the modification of each amount of wavelength converting material necessary to shift the color of light emitted from LED based illumination device 100 from the value measured in block 301 to a target color point within a predetermined tolerance. The modification of each amount of wavelength converting material is based on the direction of color shift associated with each wavelength converting material and the magnitude of color shift associated with different amounts of each wavelength converting material. Material modification planning tool 320 communicates a signal 325 indicative of the material modification plan to material modification system 330. The material modification plan includes the amount of each wavelength material to be modified and the location on LED based illumination device 100 where each wavelength converting material should be modified.

In block 303, material modification system 330 modifies the amounts of the first and second wavelength converting materials in accordance with the material modification plan. For example, as illustrated in FIG. 14, controller 331 receives signal 325 indicative of the material modification plan. In response, controller 331 controls the laser power output of laser 332 and galvo scanner 333 to remove a portion of at least two different wavelength converting materials in accordance with the material modification plan.

Figure 15:
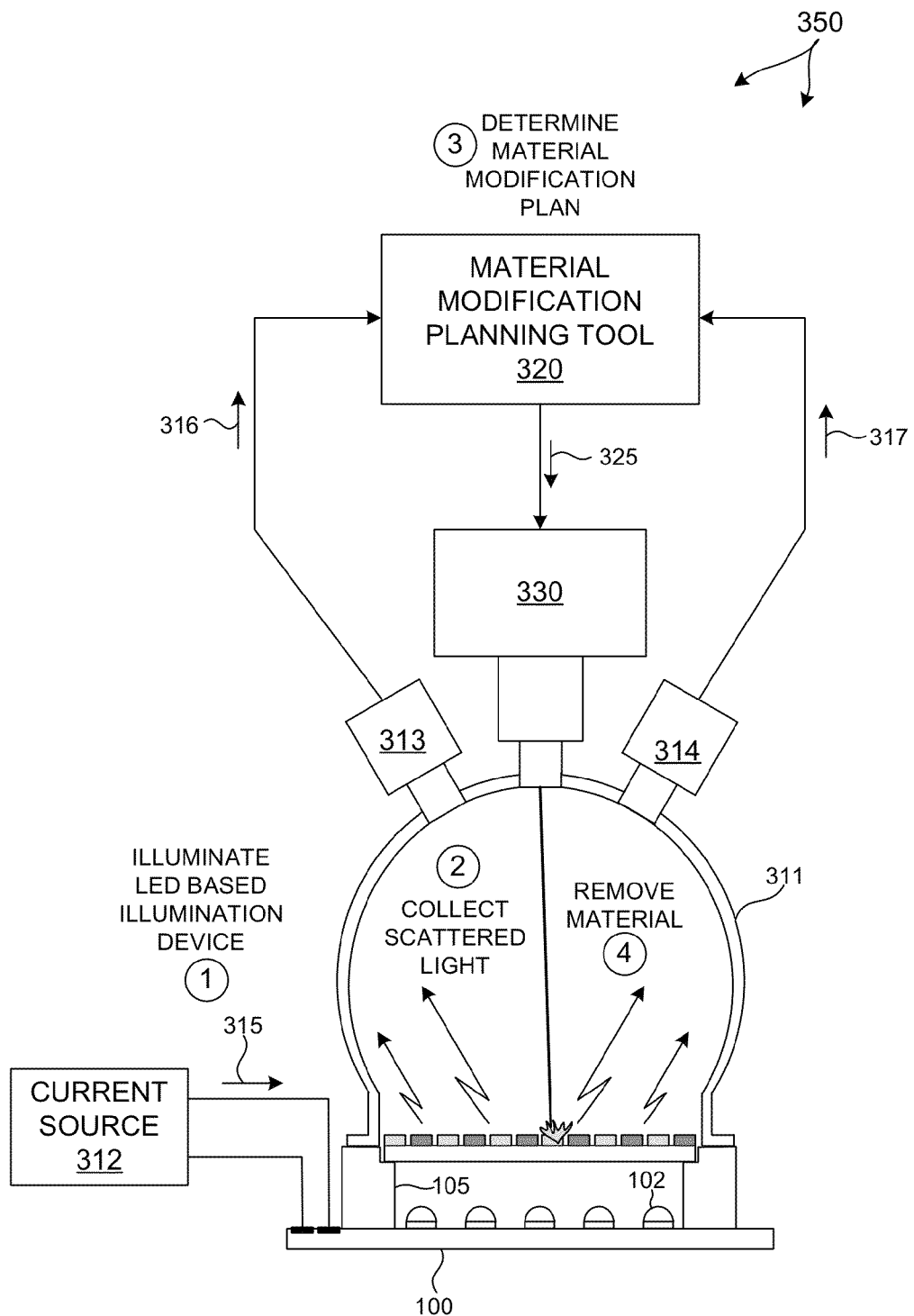
FIG. 15 is illustrative of another embodiment of a system for automatically tuning the color of light emitted from an assembled LED based illumination device within a predefined tolerance of a target color point by removing portions of two different wavelength converting materials.

FIG. 15 is illustrative of system 350 in another embodiment. In the illustrated embodiment, the optical detection system 310 and the material modification system 330 are implemented on a common mechanical platform. In this manner, LED based illumination device 100 does not have to be transported to separate process stations for color measurement and material modification.

To tune the color point of light emitted from an LED based illumination device 100, material modification planning tool 320 determines the appropriate modification to each amount of wavelength converting material necessary to achieve the desired color shift. In addition, material modification planning tool 320 also determines where the material modification should occur. In some examples, a thin line or set of lines of wavelength converting material may be added or removed in specific locations of LED based illumination device 100. In some other examples, a series of dots of wavelength converting material may be added or removed in specific locations of LED based illumination device 100.

In another aspect, material modification planning tool 320 determines where material modification should occur based on another performance metric of LED based illumination device 100, in addition to color point.

Figure 19:
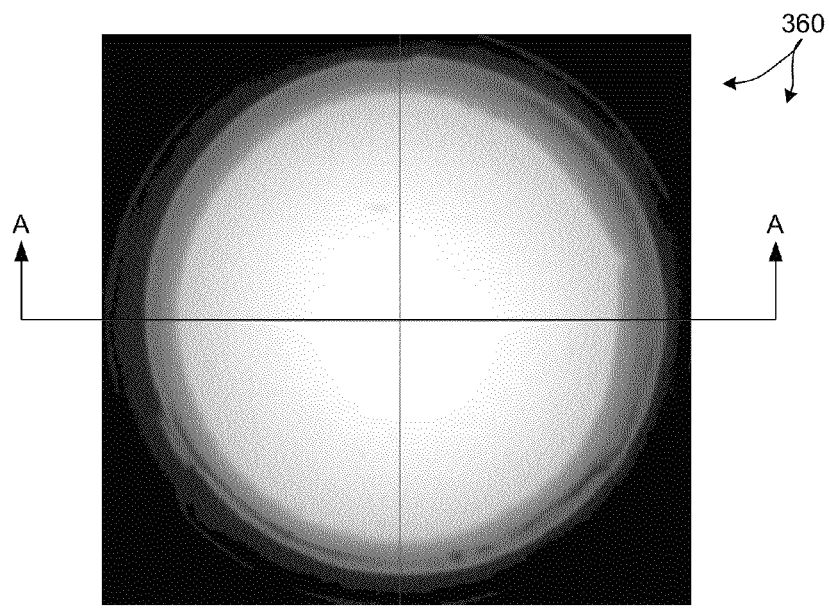
FIG. 19 is illustrative of an image collected by a camera of the light emitting surface of LED based illumination device.
Figure 20:
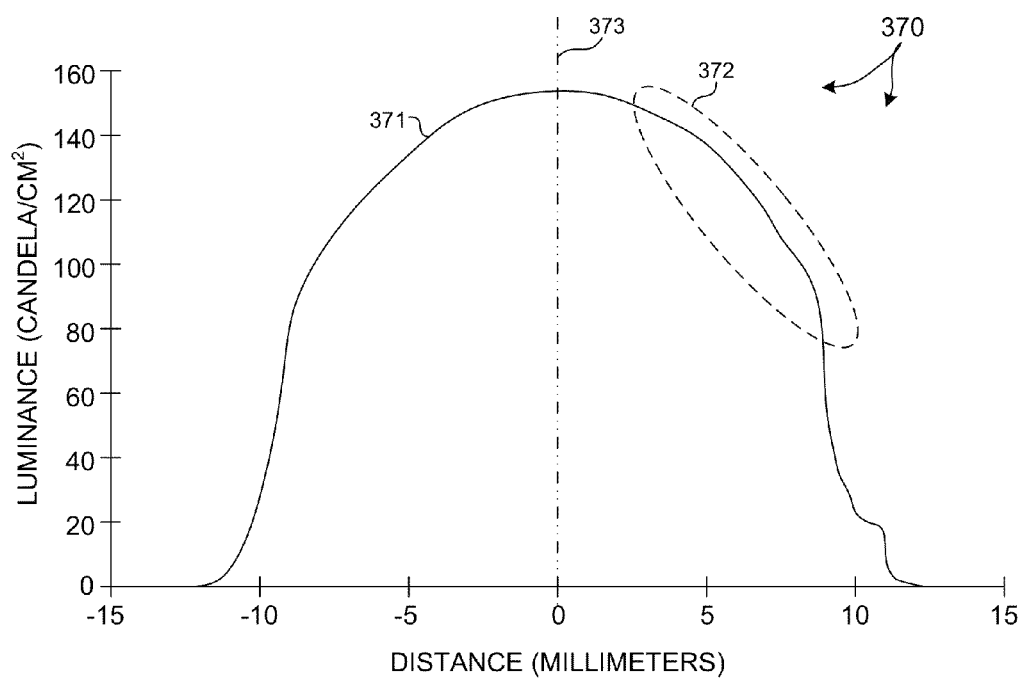
FIG. 20 is a plot illustrative of the luminance across the emitting surface of LED based illumination device at Section line A illustrated in FIG. 19.

In one example, the location of a material modification is based at least in part on an output beam intensity distribution of the LED based illumination device. FIG. 19 is illustrative of an image 360 collected by a camera (e.g., camera 314) of the light emitting surface of LED based illumination device 100. In one example, this image information 317 is communicated to material modification planning tool 320 as illustrated in FIGS. 14 and 15. FIG. 20 is a plot 370 illustrative of the luminance 371 across the emitting surface of LED based illumination device 100 at Section line A illustrated in FIG. 19. As highlighted in FIG. 20, the luminance at the emitting surface of LED based illumination device 100 is not perfectly symmetric. For example, portion 372 highlighted in FIG. 20 exhibits greater luminance than a corresponding portion opposite axis 373. Based on this measurement, material modification planning tool 320 determines a material modification plan that adds wavelength converting materials needed to reach the target color point in the area of portion 372 such that the luminance of the modified device is exhibits improved output beam uniformity.

Figure 21:
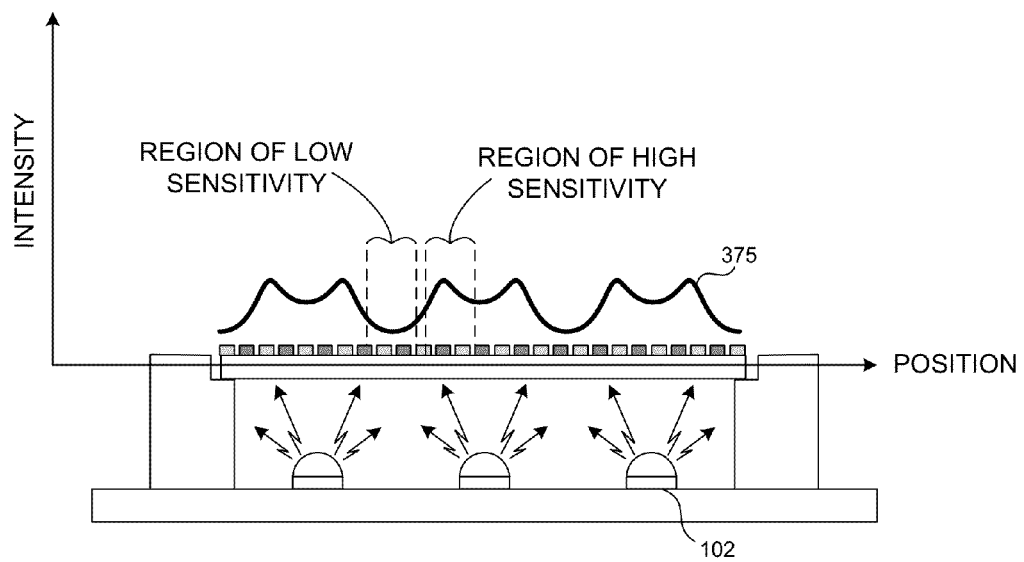
FIG. 21 shows an illustrative plotline indicative of a spatial variation in intensity of light emitted from LEDs in a plane that is coplanar with transmissive plate.
Figure 22:
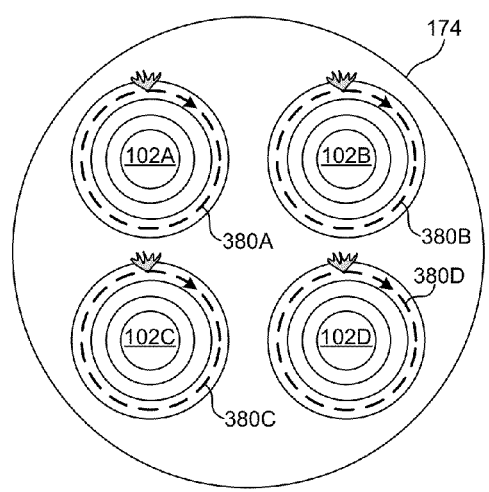
FIG. 22 is illustrative of a material modification plan that includes trajectories of material removal that are a fixed distance from each underlying LED location.

In another example, the location of a material modification is based at least in part on achieving an improved color conversion efficiency of the assembled LED based illumination device. FIG. 21 shows an illustrative plotline 375 indicative of a spatial variation in intensity of light emitted from LEDs 102 in a plane that is coplanar with transmissive plate 174. As a result of this spatial variation, wavelength converting material located on transmissive plate 174 is subjected to different levels of excitation light depending on location. For example, in areas of peak intensity the wavelength converting material may be more sensitive to changes in the amount of material compared to areas with less intensity. Thus, changes in the amount of wavelength converting material may have differing effect on color point and overall conversion efficiency based on their location. Based on the known emission pattern and the initial layout of the wavelength converting materials, material modification planning tool 320 determines a material modification plan that adds or removes wavelength converting materials needed to reach the target color point in areas that exhibit improved color conversion efficiency. For example in FIG. 22, a material modification plan includes trajectories of material removal 380A-D that are a fixed distance from each underlying LED location.

In yet another example, the location of a material modification is based at least in part on achieving an improved temperature distribution over a light emitting surface of the assembled LED based illumination device. An infrared image of the emission surface of transmissive plate 174 may be used to determine "hot spots" on the emission surface. These "hot spots" may indicate a disproportionate amount of color conversion. In response, material modification planning tool 320 determines a material modification plan that adds or removes wavelength converting materials needed to reach the target color point in areas that minimize "hot spots" on the emitting surface of LED based illumination device 100.

In yet another example, the location of a material modification is based at least in part on achieving an improved color uniformity over a light emitting surface of the assembled LED based illumination device. An image of the emission surface of transmissive plate 174 may be used to determine the color temperature at different locations on the emission surface. Differences in color temperature may indicate non-uniformity of material coatings or differences in peak emission wavelength of different LEDs 102. In response, material modification planning tool 320 determines a material modification plan to add or remove wavelength converting materials to reach the target average color point and also improves color temperature uniformity on the light emitting surface of LED based illumination device 100.

Although certain specific embodiments are described above for instructional purposes, the teachings of this patent document have general applicability and are not limited to the specific embodiments described above. For example, although LED based illumination device 100 is depicted as emitting from the top of the device (i.e., the side opposite the LED mounting board 104), in some other embodiments, LED based illumination device 100 may emit light from the side of the device (i.e., a side adjacent to the LED mounting board 104). In another example, any component of LED based illumination device 100 may be patterned with phosphor. Both the pattern itself and the phosphor composition may vary. In one embodiment, the illumination device may include different types of phosphors that are located at different areas of LED based illumination device 100. For example, a red phosphor may be located on the bottom side of transmissive plate 174 and yellow and green phosphors may be located on the top of transmissive plate 174. In one embodiment, different types of phosphors, e.g., red and green, may be located on different areas on transmissive plate 174 or shaped lens 172. For example, one type of phosphor may be patterned on transmissive plate 174 or shaped lens 172 at a first area, e.g., in stripes, spots, or other patterns, while another type of phosphor is located on a different second area of on transmissive plate 174 or shaped lens 172. If desired, additional phosphors may be used and located in different areas. Additionally, if desired, only a single type of wavelength converting material may be used and patterned on transmissive plate 174 or shaped lens 172. In another example, LED based illumination device 100 is depicted in FIGS. 1-3 as a part of a luminaire 150. As illustrated in FIG. 3, LED based illumination device 100 may be a part of a replacement lamp or retrofit lamp. But, in another embodiment, LED based illumination device 100 may be shaped as a replacement lamp or retrofit lamp and be considered as such. Accordingly, various modifications, adaptations, and combinations of various features of the described embodiments can be practiced without departing from the scope of the invention as set forth in the claims.

What is claimed is:
1. A method comprising:
measuring a first color of light emitted from an assembled LED based illumination device that includes an amount of a first wavelength converting material and an amount of a second wavelength converting material;

determining a material modification plan based at least in part on the first color of light that includes determining an amount of at least the first wavelength converting material to modify, wherein the assembled LED based illumination device, with the amount of at least the first wavelength converting material modified in accordance with the material modification plan, emits a second color of light within a predetermined tolerance of a target color point, and determining the material modification plan further includes determining locations for the modification of the amount of the first wavelength converting material based on a performance metric for the assembled LED based illumination device that is in addition to the target color point; and modifying the amount of the first wavelength converting material of the assembled LED based illumination device in accordance with the material modification plan.

2. The method of claim 1, wherein determining the material modification plan further includes determining an amount of the amount of the second wavelength converting material to modify, wherein the assembled LED based illumination device, with the amount of the first wavelength converting material and the amount of the second wavelength converting material modified in accordance with the material modification plan, emits the second color of light within the predetermined tolerance of a target color point, and determining the material modification plan further includes determining locations for the modification of the amount of the second wavelength converting material based on the performance metric for the assembled LED based illumination device that is in addition to the target color point.

3. The method of claim 1, wherein the modification of the amount of the first wavelength converting material includes either adding or removing a portion of the first wavelength converting material.

4. The method of claim 1, wherein the performance metric for the assembled LED based illumination device comprises any of an output beam intensity distribution of the assembled LED based illumination device, a color conversion efficiency of the assembled LED based illumination device, a color uniformity of the assembled LED based illumination device, and a temperature distribution over a light emitting surface of the assembled LED based illumination device.

5. The method of claim 1, wherein the amount of the first wavelength converting material and the amount of the second wavelength converting material are located on a color conversion element of the assembled LED based illumination device.

6. The method of claim 5, wherein the amount of the first wavelength converting material and the amount of the second wavelength converting material are physically separated on the color conversion element of the assembled LED based illumination device.

7. The method of claim 5, wherein the color conversion element is an output window of the assembled LED based illumination device.

8. The method of claim 2, wherein the modification of the amount of the first wavelength converting material produces a color point shift along a first direction in a CIE 1976 u'v' diagram in response to an amount of light produced by at least one light emitting diode of the assembled LED based illumination device and the modification of the amount of the second wavelength converting material produces a color point shift along a second direction in the CIE 1976 u'v' diagram in response to the amount of light produced by the at least one light emitting diode, wherein the first direction and the second direction are not parallel.

9. The method of claim 1, wherein the second color of light has a color point that is within a degree of departure $\Delta u'v'$ of 0.009 from the target color point in a CIE 1976 u'v' diagram.

10. The method of claim 3, wherein the removing an amount of the first wavelength converting material is achieved by any of laser ablation, mechanical scribing, ion etching, chemical etching, electrical discharge machining, plasma etching, and chemical mechanical polishing.

11. The method of claim 3, wherein the adding an amount of the first wavelength converting material is achieved by any of jet dispensing, spray coating, screen printing, and blade coating.

12. The method of claim 1, wherein the amount of the first wavelength converting material is arranged as a first plurality of dots, and wherein the amount of the second wavelength converting material is arranged as a second plurality of dots.

13. The method of claim 12, wherein each of the first plurality of dots is physically separated from each of the second plurality of dots.

14. A method of tuning an assembled LED based illumination device comprising:

providing the assembled LED based illumination device including an amount of a first wavelength converting material and an amount of a second wavelength converting material;

measuring a color of light emitted from the assembled LED based illumination device;

determining an amount of the first wavelength converting material to modify to change the color of light emitted from the assembled LED based illumination device to a target color point within a predetermined tolerance;

determining locations for the modification of the first wavelength converting material based on a performance metric to be achieved by the assembled LED based illumination device that is in addition to the target color point; and modifying the first wavelength converting material of the assembled LED based illumination device by the determined amount and at the determined locations.

15. The method of claim 14, further comprising:

determining an amount of the second wavelength converting material to modify to change the color of light emitted from the assembled LED based illumination device to the target color point within the predetermined tolerance;

determining locations for the modification of the second wavelength converting material based on the performance metric to be achieved by the assembled LED based illumination device that is in addition to the target color point; and modifying the determined amount of the second wavelength converting material at the determined locations for the modification of the second wavelength converting material of the assembled LED based illumination device.

16. The method of claim 14, further comprising:

determining a second color point of light emitted from the assembled LED based illumination device after the modification of the amount of the first wavelength converting material.

17. The method of claim 16, wherein the second color point of light emitted from the assembled LED based illumination after modification is within a degree of departure $\Delta u'v'$ of 0.009 from the target color point in a CIE 1976 u'v' diagram.

18. The method of claim 14, wherein the first wavelength converting material and the second wavelength converting material are located on a surface of a transparent element located above at least one light emitting diode of the assembled LED based illumination device.

19. The method of claim 14, wherein the modifying the determined amount of the first wavelength converting material includes any of adding an amount of the first wavelength converting material and removing an amount of the first wavelength converting material at the determined locations for the modification of the first wavelength converting material of the assembled LED based illumination device.

20. The method of claim 19, wherein the removing an amount of the first wavelength converting material is achieved by any of laser ablation, mechanical scribing, ion etching, chemical etching, electrical discharge machining, plasma etching, and chemical mechanical polishing.

21. The method of claim 19, wherein the adding an amount of the first wavelength converting material is achieved by any of jet dispensing, spray coating, screen printing, and blade coating.

22. The method of claim 14, wherein the performance metric for the assembled LED based illumination device comprises any of an output beam intensity distribution of the assembled LED based illumination device, a color conversion efficiency of the assembled LED based illumination device, a color uniformity of the assembled LED based illumination device, and a temperature distribution over a light emitting surface of the assembled LED based illumination device.

23. A set of assembled LED based illumination devices, wherein each of the assembled LED based illumination devices in the set comprises:
at least one light emitting diode;
an amount of a first wavelength converting material overlying the at least one light emitting diode comprising a modified portion that is modified from an initial amount of the first wavelength converting material, wherein the modified portion of the first wavelength converting material in each assembled LED based illumination devices in the set is modified by a different amount and at different locations with respect to other assembled LED based illumination devices in the set; and
an amount of a second wavelength converting material overlying the at least one light emitting diode, the at least one light emitting diode, the amount of the first wavelength converting material comprising the modified portion, and the amount of the second wavelength converting material in each assembled LED based illumination devices in the set produces an emitted color of light that is within a predetermined tolerance to a target color point and achieves a desired performance metric that is in addition to the target color point.

24. The set of assembled LED based illumination devices of claim 23, wherein the desired performance metric comprises any of a desired output beam intensity distribution of each of the assembled LED based illumination devices, a desired color conversion efficiency of each of the assembled LED based illumination devices, a desired color uniformity of each of the assembled LED based illumination devices, and a desired temperature distribution over a light emitting surface of each of the assembled LED based illumination devices.

25. The set of assembled LED based illumination devices of claim 23, wherein the modified portion of the first wavelength converting material in each assembled LED based illumination device in the set is modified by either adding or removing the portion of the first wavelength converting material.

26. The set of assembled LED based illumination devices of claim 23, wherein the amount of the second wavelength converting material comprises a modified portion that is modified from an initial amount of the second wavelength converting, wherein the modified portion of the second wavelength converting material in each assembled LED based illumination devices in the set is modified by a different amount and at different locations with respect to other assembled LED based illumination devices in the set.

27. An assembled LED based illumination device comprising:
at least one light emitting diode, an amount of a first wavelength converting material, and an amount of a second wavelength converting material, and is produced by a process comprising:
measuring a color of light emitted from the assembled LED based illumination device;
determining an amount of the first wavelength converting material to modify to change the color of light emitted from the assembled LED based illumination device to a target color point within a predetermined tolerance;
determining locations for the modification of the first wavelength converting material based on a performance metric to be achieved by the assembled LED based illumination device that is in addition to the target color point; and
modifying a portion of the first wavelength converting material by the determined amount and at the determined locations for the modification, where the at least one light emitting diode, the amount of the first wavelength converting material comprising the modified portion, and the amount of the second wavelength converting material in the assembled LED based illumination device produces an emitted color of light that is within the predetermined tolerance to the target color point and achieves the performance metric that is in addition to the target color point.

* * * * *